United States Patent
Kobayashi et al.

(10) Patent No.: US 9,765,189 B2
(45) Date of Patent: Sep. 19, 2017

(54) METHOD FOR PREPARING ORGANOPOLYSILOXANE EMULSION COMPOSITION

(71) Applicant: SHIN-ETSU CHEMICAL CO., LTD., Tokyo (JP)

(72) Inventors: Akihiro Kobayashi, Annaka (JP); Yuko Takada, Annaka (JP); Shunji Aoki, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 15/061,311

(22) Filed: Mar. 4, 2016

(65) Prior Publication Data
US 2016/0257787 A1 Sep. 8, 2016

(30) Foreign Application Priority Data

Mar. 5, 2015 (JP) .................. 2015-043218
Oct. 8, 2015 (JP) .................. 2015-199826

(51) Int. Cl.
C08G 77/06 (2006.01)
C08G 77/16 (2006.01)
C08L 83/04 (2006.01)

(52) U.S. Cl.
CPC ............. *C08G 77/06* (2013.01); *C08G 77/16* (2013.01); *C08L 83/04* (2013.01); *C08L 2201/52* (2013.01)

(58) Field of Classification Search
None
See application file for complete search history.

(56) References Cited

U.S. PATENT DOCUMENTS

| | | | | |
|---|---|---|---|---|
| 6,232,396 B1* | 5/2001 | Dong | .................. | C08G 77/06 424/401 |
| 7,683,119 B2* | 3/2010 | Creutz | .................. | A61K 8/062 516/53 |
| 8,729,183 B2* | 5/2014 | Rautschek | ............... | A61K 8/06 524/706 |
| 9,072,666 B2 | 7/2015 | Ando | | |
| 9,156,954 B2 | 10/2015 | Cauvin et al. | | |
| 2006/0111452 A1* | 5/2006 | Wallace | .................... | A61K 8/06 516/53 |
| 2007/0244213 A1* | 10/2007 | Wallace | ................. | A61K 8/066 523/102 |
| 2007/0276087 A1* | 11/2007 | Paul | ....................... | C08G 77/06 524/837 |
| 2008/0033062 A1* | 2/2008 | Herzig | ................. | C08G 77/388 516/55 |
| 2008/0064813 A1* | 3/2008 | Schneider | ............. | C08G 77/06 524/837 |
| 2011/0269892 A1 | 11/2011 | Brehm et al. | | |
| 2012/0171147 A1* | 7/2012 | Rautschek | ............... | A61K 8/06 424/70.12 |
| 2013/0116381 A1* | 5/2013 | Keinath | ................. | C08G 77/06 524/860 |
| 2014/0093547 A1* | 4/2014 | Cauvin | ................. | A61K 8/062 424/401 |
| 2014/0378553 A1* | 12/2014 | Ando | ....................... | C08K 5/42 514/772.3 |
| 2015/0290091 A1* | 10/2015 | Ando | ....................... | A61Q 5/02 424/401 |

FOREIGN PATENT DOCUMENTS

| | | | | |
|---|---|---|---|---|
| EP | 2 706 080 A1 | 3/2014 | | |
| JP | S34-2041 B | 4/1959 | | |
| JP | S41-13995 B | 8/1966 | | |
| JP | 2002-20490 A | 1/2002 | | |
| JP | WO 2013161500 A1 * | 10/2013 | ............. | C08L 71/02 |
| JP | 5382273 B1 | 1/2014 | | |
| JP | 2014/512418 A | 5/2014 | | |
| WO | WO 2012/119916 A1 | 9/2012 | | |

OTHER PUBLICATIONS

Extended European Search Report dated May 2, 2016, for European Application No. 16157988.3.

* cited by examiner

*Primary Examiner* — Robert S Loewe
(74) *Attorney, Agent, or Firm* — Birch, Stewart, Kolasch & Birch, LLP

(57) ABSTRACT

An organopolysiloxane emulsion composition having good age stability is prepared by (I) emulsifying a mixture comprising (A) an organopolysiloxane of formula: $HO(R^1_2SiO)_nH$, (B) a surfactant and (C-1) water to form a first emulsion composition and (II) effecting emulsion polymerization of the first emulsion composition in the presence of (D) an acid catalyst below 40° C. The target emulsion composition contains an organopolysiloxane product having a viscosity≥300,000 mPa·s at 25° C. and an octamethylcyclotetrasiloxane content≤3,000 ppm, and has an emulsified particle size≤500 nm.

12 Claims, No Drawings

METHOD FOR PREPARING ORGANOPOLYSILOXANE EMULSION COMPOSITION

CROSS-REFERENCE TO RELATED APPLICATION

This non-provisional application claims priority under 35 U.S.C. §119(a) on Patent Application Nos. 2015-043218 and 2015-199826 filed in Japan on Mar. 5, 2015 and Oct. 8, 2015, respectively, the entire contents of which are hereby incorporated by reference.

TECHNICAL FIELD

This invention relates to a method for preparing an organopolysiloxane emulsion composition.

BACKGROUND ART

Organopolysiloxane emulsion compositions are often used in such products as cosmetics, personal care products, household products, and parting agents. The emulsion required in these applications is an emulsion of a high-viscosity organopolysiloxane having a small particle size and good age stability. However, when high-viscosity organopolysiloxane is directly emulsified, the size of emulsified particles is of the order of several microns at the lower limit, i.e., it is difficult to form smaller particles than this level. The resulting emulsion has poor age stability. For the purpose of obtaining emulsified particles having a small particle size and good age stability, studies were made on the method for preparing an emulsion via emulsion polymerization.

For example, it is known from Patent Documents 1 and 2: JP-B S34-2041 and JP-B S41-13995 that cyclic siloxane oligomers are emulsified before emulsion polymerization is conducted in the presence of strong acids or strong bases. With these techniques, emulsions having an emulsified particle size of up to 300 nm are obtainable.

Recently, octamethylcyclotetrasiloxane (D4) becomes a matter of concern as environmental load substance. Products having a reduced content of D4 are required. It is known that with the methods of Patent Documents 1 and 2, the organopolysiloxanes in the resulting emulsions have a D4 content as high as 40,000 ppm or more. Attempts were made to reduce the D4 content.

One known approach (Patent Document 3: JP 5382273) is a method involving the steps of emulsifying a silanol-terminated organopolysiloxane having a kinematic viscosity of 3,000 to 100,000 mm$^2$/s at 25° C. and an octamethylcyclotetrasiloxane (D4) content of up to 1,000 ppm and effecting emulsion polymerization in the presence of an acid catalyst at a temperature of lower than 40° C. Allegedly, this method yields an emulsion of an organopolysiloxane containing 3,000 ppm or less of D4. However, since the monomer subject to polymerization has a high kinematic viscosity of 3,000 to 100,000 mm$^2$/s, the method requires high mechanical shear to reduce the particle size in the emulsion of the monomer. As a result, sometimes the emulsion has poor age stability.

Another known approach (Patent Document 4: JP-A 2014-512418) is a method involving the steps of emulsifying a silanol-terminated organopolysiloxane having a kinematic viscosity of 2,000 to 150,000 mm$^2$/s at 25° C., water and a surfactant and effecting emulsion polymerization in the presence of an acid catalyst at a temperature of up to 16° C. This method can control the extra formation of D4 in the resulting organopolysiloxane. However, since the monomer subject to polymerization has a high kinematic viscosity of 2,000 to 150,000 mm$^2$/s, the method requires a large amount of surfactant in order to prepare an emulsion of submicron particles.

There is a need to establish a method of preparing an organopolysiloxane emulsion composition having a submicron particle size and good age stability, without a need for an excess of surfactant, while suppressing the extra formation of D4 in the organopolysiloxane.

CITATION LIST

Patent Document 1: JP-B S34-2041
Patent Document 2: JP-B S41-13995
Patent Document 3: JP 5382273 (U.S. Pat. No. 9,072,666, EP 2706080)
Patent Document 4: JP-A 2014-512418 (U.S. Pat. No. 9,156,954, EP 2680812)

DISCLOSURE OF INVENTION

An object of the invention is to provide a method for preparing an organopolysiloxane emulsion composition having a submicron particle size and good age stability while using a limited amount of surfactant and suppressing the extra formation of octamethylcyclotetrasiloxane in the organopolysiloxane.

The inventors have found that an organopolysiloxane emulsion composition having a submicron particle size and good age stability can be prepared by (1) using an organopolysiloxane having a silanol group at the end of the molecular chain and having a kinematic viscosity of 200 mm$^2$/s to less than 2,000 mm$^2$/s at 25° C. as the starting reactant and (2) limiting the amount of a surfactant for emulsifying the organopolysiloxane to 8 parts by weight or less per 100 parts by weight of the organopolysiloxane. This method eliminates a need to use a large amount of surfactant and suppresses the extra formation of D4 in the organopolysiloxane product. The particle size of emulsified particles is as small as 500 nm or less. The age stability of the emulsion composition is better than any prior art prior art compositions.

According to the invention, there is provided a method for preparing an organopolysiloxane emulsion composition comprising the steps of:

(I) emulsifying a mixture to form a first emulsion composition, the mixture comprising (A) 100 parts by weight of an organopolysiloxane having the general formula (1):

$$HO(R^1_2SiO)_nH \qquad (1)$$

wherein R$^1$ is independently hydrogen or a substituted or unsubstituted monovalent hydrocarbon group of 1 to 20 carbon atoms and n is such a number that the organopolysiloxane may have a kinematic viscosity of 200 mm$^2$/s to less than 2,000 mm$^2$/s at 25° C., said organopolysiloxane having an octamethylcyclotetrasiloxane content of up to 1,000 ppm, (B) 1 to 8 parts by weight of a surfactant, and (C-1) 1 to 10,000 parts by weight of water, and (II) optionally adding (C-2) 0 to 10,000 parts by weight of water and effecting emulsion polymerization of the first emulsion composition in the presence of (D) an acid catalyst, which is optional when component (B) is catalytic, at a temperature of lower than 40° C., thereby forming a target organopolysiloxane emulsion composition which contains an organopolysiloxane product having a viscosity of at least 300,000 mPa·s at 25° C. and an octamethylcyclotetrasiloxane content of up to 3,000 ppm and has an emulsified particle size of up to 500 nm.

In a preferred embodiment, the surfactant (B) is an anionic surfactant optionally in admixture with a nonionic surfactant.

In a preferred embodiment, when the first emulsion composition is prepared in step (I) using an emulsifying machine for processing emulsified particles under pressure to a smaller size, the amount of water (C-1) is 1 to 10,000 parts by weight per 100 parts by weight of component (A). When the first emulsion composition is prepared in step (I) using an emulsifying machine for processing emulsified particles under shear force to a smaller size, the amount of water (C-1) is 1 to 10 parts by weight per 100 parts by weight of component (A).

In a preferred embodiment, the acid catalyst (D) is present in an amount of at least 0.1 part by weight per 100 parts by weight of component (A), with the proviso that when the surfactant (B) contains a catalytic fraction which is encompassed in the acid catalyst (D), the amount of the acid catalyst (D) is inclusive of the amount of said fraction of surfactant (B).

In a preferred embodiment, the first emulsion composition resulting from step (I) has an emulsified particle size of up to 500 nm.

In a preferred embodiment, the emulsion polymerization is performed at a temperature of lower than 25° C. Also preferably, the emulsion polymerization is performed for a time within 48 hours.

In a preferred embodiment, the target emulsion composition contains emulsified particles with an average particle size of up to 200 nm.

In a preferred embodiment, the organopolysiloxane product in the target emulsion composition has a viscosity of at least 1,000,000 mPa·s at 25° C.

In a preferred embodiment, the organopolysiloxane product in the target emulsion composition has an octamethylcyclotetrasiloxane content of up to 2,000 ppm.

ADVANTAGEOUS EFFECTS OF INVENTION

The emulsion composition according to the invention comprises an organopolysiloxane having a viscosity of at least 300,000 mPa·s at 25° C. and has a particle size of up to 500 nm and good age stability.

DESCRIPTION OF PREFERRED EMBODIMENTS

As is common in the art, the compound: octamethylcyclotetrasiloxane is sometimes abbreviated as D4. The notation (Cn-Cm) means a group containing from n to m carbon atoms per group. It is noted that the viscosity is measured at 25° C. by an Ostwald viscometer. The term "ppm" is parts by weight per million parts by weight.

The preparation method of the invention starts with several components, which are described below.

(A) Organopolysiloxane

Component (A) is an organopolysiloxane having the general formula (1).

$$HO(R^1_2SiO)_nH \tag{1}$$

Herein $R^1$ is independently hydrogen or a substituted or unsubstituted monovalent hydrocarbon group of 1 to 20 carbon atoms and n is such a number that the organopolysiloxane may have a kinematic viscosity of 200 mm²/s to less than 2,000 mm²/s at 25° C. The organopolysiloxane has an octamethylcyclotetrasiloxane (D4) content of up to 1,000 ppm.

In formula (1), $R^1$ is independently hydrogen or a substituted or unsubstituted monovalent hydrocarbon group of 1 to 20 carbon atoms. Examples of the unsubstituted monovalent hydrocarbon group include $C_1$-$C_{20}$ alkyl, $C_3$-$C_{20}$ cycloalkyl, $C_2$-$C_{20}$ alkenyl, $C_6$-$C_{20}$ aryl, and $C_7$-$C_{20}$ aralkyl groups. Specifically, suitable groups are alkyl groups such as methyl, ethyl, propyl, butyl, pentyl, hexyl, heptyl, octyl, nonyl, decyl, dodecyl, tetradecyl, hexadecyl and octadecyl; cycloalkyl groups such as cyclopentyl and cyclohexyl; alkenyl groups such as vinyl and allyl, and aryl groups such as phenyl, tolyl and naphthyl. Examples of the substituted monovalent hydrocarbon group include substituted forms of the foregoing in which some hydrogen atoms are substituted by halogen, amino, acryloxy, methacryloxy, epoxy, mercapto, carboxyl or hydroxyl. Preferred are monovalent hydrocarbon groups of 1 to 6 carbon atoms, such as methyl, ethyl, propyl, butyl and phenyl. It is more preferred that methyl account for at least 80% of all $R^1$.

The subscript n is such a number that the organopolysiloxane may have a kinematic viscosity at 25° C. of 200 mm²/s to less than 2,000 mm²/s, preferably 400 to 1,800 mm²/s, and more preferably 600 to 1,600 mm²/s. If the kinematic viscosity is less than 200 mm²/s, the time of emulsion polymerization must be prolonged in order to bring the organopolysiloxane in the target emulsion to the desired level of kinematic viscosity, or the amount of D4 formed as by-product may increase in the course of emulsion polymerization. If the kinematic viscosity is 2,000 mm²/s or higher, a larger amount of emulsifier or surfactant is required to reduce the particle size of the target emulsion.

The content of D4 in the organopolysiloxane (A) is up to 3,000 ppm, preferably up to 1,000 ppm, and more preferably up to 500 ppm. The D4 content may be 0 ppm although the lower limit is not critical.

(B) Surfactant

Component (B) is a surfactant which may be either a nonionic surfactant or an anionic surfactant, which may be used alone or in admixture of two or more. Of these, the anionic surfactant is preferred while it may be optionally used in admixture with the nonionic surfactant.

Suitable nonionic surfactants include polyoxyalkylene alkyl ethers, polyoxyalkylene alkyl phenyl ethers, polyoxyalkylene alkyl esters, polyoxyalkylene sorbitan alkyl esters, polyethylene glycol, polypropylene glycol, and diethylene glycol, which may be used alone or in admixture. Of these, preferred are those of the general formula (2).

$$R^2O(EO)_p(PO)_qH \tag{2}$$

Herein $R^2$ is a straight or branched $C_8$-$C_{30}$ alkyl group, EO is ethylene oxide, PO is propylene oxide, the sequence of EO and PO may be random or blockwise, p and q each are an integer of 0 to 100, and p+q>0. More preferably, $R^2$ is a straight or branched $C_8$-$C_{13}$ alkyl group, each of p and q is 0 to 25, and 0<p+q≤50.

Suitable anionic surfactants are the following surfactants [1] to [5], which may be used alone or in admixture of any two or more.

[1] Alkyl Sulfuric Acid and Salt Thereof Having the General Formula (3)

$$R^3OSO_3M \tag{3}$$

Herein $R^3$ is a straight or branched $C_6$-$C_{30}$ alkyl group and M is a hydrogen ion, an alkali metal ion such as potassium or sodium, an alkaline earth metal ion such as magnesium or calcium, an ammonium ion, or a tertiary ammonium ion such as triethanolammonium.

In formula (3), $R^3$ is preferably a straight or branched $C_6$-$C_{12}$ alkyl group. From the aspect of emulsifying effect, M is preferably a sodium, potassium, ammonium or triethanolammonium ion.

Examples of the alkyl sulfuric acid and salt having formula (3) include hexyl sulfuric acid, octyl sulfuric acid, decyl sulfuric acid, dodecyl sulfuric acid, tetradecyl sulfuric acid, hexadecyl sulfuric acid, octadecyl sulfuric acid, and icosyl sulfuric acid as well as alkali metal salts thereof such as lithium, sodium and potassium salts, alkaline earth metal salts thereof such as magnesium and calcium salts, triethanolammonium salts thereof, and ammonium salts thereof.

[2] Alkylbenzenesulfonic Acid and Salt Thereof Having the General Formula (4)

$$R^3-C_6H_4-SO_3M \qquad (4)$$

Herein $R^3$ and M are as defined in formula (3).

In formula (4), $R^3$ is preferably a straight or branched $C_6$-$C_{12}$ alkyl group. From the aspect of emulsifying effect, M is preferably a sodium, potassium, ammonium or triethanolammonium ion.

Examples of the alkylbenzenesulfonic acid and salt having formula (4) include hexylbenzenesulfonic acid, octylbenzenesulfonic acid, decylbenzenesulfonic acid, dodecylbenzenesulfonic acid, tetradecylbenzenesulfonic acid, and hexadecylbenzenesulfonic acid, and salts thereof.

[3] Higher Fatty Acid and Salt Thereof

Examples of the higher fatty acid and salt thereof include lauric acid, stearic acid, oleic acid, and linoleic acid as well as alkali metal salts thereof such as lithium, sodium and potassium salts, alkaline earth metal salts thereof such as magnesium and calcium salts, triethanolammonium salts thereof, and ammonium salts thereof.

[4] Polyoxyethylene Alkyl Ether Sulfuric Acid and Salt Thereof Having the General Formula (5)

$$R^3O(EO)_i(PO)_jSO_3M \qquad (5)$$

Herein $R^3$ and M are as defined in formula (3). EO is ethylene oxide, PO is propylene oxide, the sequence of EO and PO may be random or blockwise, each of i and j is an integer of 0 to 100, and i+j>0.

Examples of the polyoxyethylene alkyl ether sulfuric acid and salt thereof include polyoxyethylene hexyl ether sulfuric acid, polyoxyethylene octyl ether sulfuric acid, polyoxyethylene decyl ether sulfuric acid, polyoxyethylene dodecyl ether sulfuric acid, polyoxyethylene tetradecyl ether sulfuric acid, polyoxyethylene hexadecyl ether sulfuric acid, polyoxyethylene octadecyl ether sulfuric acid, and polyoxyethylene icosyl ether sulfuric acid as well as alkali metal salts thereof such as lithium, sodium and potassium salts, alkaline earth metal salts thereof such as magnesium and calcium salts, triethanolammonium salts thereof, and ammonium salts thereof.

[5] Polyoxyethylene Alkyl Phenyl Ether Sulfuric Acid and Salt Thereof Having the General Formula (6)

$$R^3-C_6H_4-O(EO)_i(PO)_jSO_3M \qquad (6)$$

Herein $R^3$ and M are as defined in formula (3). EO, PO, i and j are as defined in formula (5).

Examples of the polyoxyethylene alkyl phenyl ether sulfuric acid and salt thereof include polyoxyethylene hexyl phenyl ether sulfuric acid, polyoxyethylene octyl phenyl ether sulfuric acid, polyoxyethylene decyl phenyl ether sulfuric acid, polyoxyethylene dodecyl phenyl ether sulfuric acid, polyoxyethylene tetradecyl phenyl ether sulfuric acid, and polyoxyethylene hexadecyl phenyl ether sulfuric acid as well as alkali metal salts thereof such as lithium, sodium and potassium salts, alkaline earth metal salts thereof such as magnesium and calcium salts, triethanolammonium salts thereof, and ammonium salts thereof.

The amount of component (B) used is 1 to 8 parts by weight, preferably 1.5 to 7.5 parts by weight, and more preferably 2 to 7 parts by weight per 100 parts by weight of component (A).

(C) Water

Component (C) is water (C-1) used in step (I) and water (C-2) optionally used in step (II). The amount of water (C-1) used in step (I) is 1 to 10,000 parts by weight per 100 parts by weight of component (A) while it varies with the type of emulsifying machine used for reducing the size of emulsified particles.

When emulsifying machines adapted to reduce the size of emulsified particles under pressure, such as a high-pressure homogenizer are used, the amount of water (C-1) used is 1 to 10,000 parts by weight, preferably 4 to 6,000 parts by weight, and more preferably 6 to 4,000 parts by weight per 100 parts by weight of component (A).

When emulsifying machines adapted to reduce the size of emulsified particles under shear force, such as a homo-disper (having a circular disk with saw teeth on the circumference), homo-mixer (having a rotor and a stator), and colloid mill (emulsifying by feeding components into a narrow gap between a high-speed rotating disk and a stationary disk) are used, the amount of water (C-1) used is 1 to 10 parts by weight, preferably 2 to 8 parts by weight, and more preferably 4 to 6 parts by weight per 100 parts by weight of component (A). If the amount of water (C-1) exceeds 10 parts by weight, it may be difficult to form an emulsion composition containing emulsified particles with a small size of 500 nm or less. If the amount of water (C-1) is less than 1 part by weight, it may be difficult to form an O/W type emulsion.

In step (II), water (C-2) may or may not be added. The amount of water (C-2) is preferably up to 10,000 parts by weight (0 to 10,000 parts by weight) per 100 parts by weight of component (A). When added, the amount of water (C-2) is more preferably 0.1 to 1,000 parts by weight. When shear emulsifying machines such as a homo-disper, homo-mixer and colloid mill are used, water (C-2) is desirably added.

(D) Acid Catalyst

Component (D) is an acid catalyst, which may be unnecessary if component (B) has catalysis. When used, the acid catalyst (D) may be used alone or in admixture of two or more.

Examples of component (D) are shown below.

[1] Alkyl Sulfuric Acid Having the General Formula (7) and Alkylbenzenesulfonic Acid Having the General Formula (8)

$$R^4OSO_3H \qquad (7)$$

$$R^4-C_6H_4-SO_3H \qquad (8)$$

Herein $R^4$ is a straight or branched $C_6$-$C_{30}$ alkyl group.

In formulae (7) and (8), $R^4$ is preferably a straight or branched $C_6$-$C_1$ alkyl group.

Examples of the alkyl sulfuric acid having formula (7) include hexyl sulfuric acid, octyl sulfuric acid, decyl sulfuric acid, dodecyl sulfuric acid, tetradecyl sulfuric acid, hexadecyl sulfuric acid, octadecyl sulfuric acid, and icosyl sulfuric acid.

Examples of the alkylbenzenesulfonic acid having formula (8) include hexylbenzenesulfonic acid, octylbenzenesulfonic acid, decylbenzenesulfonic acid, dodecylbenzenesulfonic acid, tetradecylbenzenesulfonic acid, and hexadecylbenzenesulfonic acid.

[2] Higher Fatty Acid

Suitable higher fatty acids include lauric acid, stearic acid, oleic acid, and linoleic acid.

[3] Polyoxyethylene Alkyl Ether Sulfuric Acid Having the General Formula (9)

$$R^4O(EO)_s(PO)_tSO_3H \quad (9)$$

Herein $R^4$ is as defined in formula (7). EO is ethylene oxide, PO is propylene oxide, the sequence of EO and PO may be random or blockwise, each of s and t is an integer of 0 to 100, and s+t>0.

Examples include polyoxyethylene hexyl ether sulfuric acid, polyoxyethylene octyl ether sulfuric acid, polyoxyethylene decyl ether sulfuric acid, polyoxyethylene dodecyl ether sulfuric acid, polyoxyethylene tetradecyl ether sulfuric acid, polyoxyethylene hexadecyl ether sulfuric acid, polyoxyethylene octadecyl ether sulfuric acid, and polyoxyethylene icosyl ether sulfuric acid.

[4] Polyoxyethylene Alkyl Phenyl Ether Sulfuric Acid Having the General Formula (10)

$$R^4-C_6H_4-O(EO)_s(PO)_tSO_3H \quad (10)$$

Herein $R^4$ is as defined in formula (7), EO, PO, s and t are as defined in formula (9).

Examples include polyoxyethylene hexyl phenyl ether sulfuric acid, polyoxyethylene octyl phenyl ether sulfuric acid, polyoxyethylene decyl phenyl ether sulfuric acid, polyoxyethylene dodecyl phenyl ether sulfuric acid, polyoxyethylene tetradecyl phenyl ether sulfuric acid, and polyoxyethylene hexadecyl phenyl ether sulfuric acid.

[5] Bronsted Acid

Examples include hydrochloric acid, hydrobromic acid, sulfuric acid, chlorosulfonic acid, phosphoric acid, orthophosphoric acid, metaphosphoric acid, polyphosphoric acid, boric acid, nitric acid, benzenesulfonic acid, methanesulfonic acid, trifluoromethanesulfonic acid, carboxylic acid, chloroacetic acid, trichloroacetic acid, trifluoroacetic acid, acetic acid, acrylic acid, benzoic acid, citric acid, crotonic acid, formic acid, fumaric acid, maleic acid, malonic acid, tannic acid, itaconic acid, lactic acid, tartaric acid, oxalic acid, phthalic acid, succinic acid, cation exchange resins, acidic zeolite, acid activated fuller's earth, and acid activated carbon black.

The amount of component (D) used is at least 0.1 part by weight, preferably at least 0.3 part by weight, and more preferably at least 0.5 part by weight per 100 parts by weight of component (A). With less than 0.1 part by weight of component (D), the polymerization rate may be significantly retarded. The upper limit is not critical, although the amount is typically equal to or less than 125 parts by weight.

Now the preparation method of the invention is described.

Step (I)

A mixture of components (A), (B) and (C) is emulsified to form a first emulsion composition. For emulsification herein, any emulsifying machines may be used, such as a homo-disper, homo-mixer, colloid mill, line mixer, universal mixer, ultra-mixer, planetary mixer, Combi mix, and high-pressure homogenizer. Of these, emulsifying machines adapted to reduce the size of emulsified particles under shear force such as a homo-disper, homo-mixer and colloid mill are preferable, with the homo-disper being more preferred.

In the emulsification step, the temperature is preferably in a range of 1 to 80° C. Where component (B) has catalysis, allowing cyclization reaction to take place at the same time, it is preferred that emulsification be conducted at a temperature of lower than 40° C. If emulsification is conducted at 40° C. or higher in this situation, there is a risk that more D4 forms. Thus, the emulsification temperature is more preferably below 30° C., even more preferably below 25° C.

In step (I), the mixture is stirred under high shear force until the first emulsion composition is preferably broken down to a particle size of up to 500 nm, more preferably up to 300 nm, and even more preferably up to 200 nm. The smaller the size of emulsified particles in step (I), the faster the polymerization rate in step (II) becomes and in turn, the shorter the polymerization time becomes. Now that the first emulsion composition resulting from step (I) has an emulsified particle size of up to 500 nm, the target emulsion resulting from step (II) has an emulsified particle size of up to 500 nm as well. It is noted that the particle size is a median diameter as measured by a laser diffraction/scattering mode particle size distribution analyzer LA-920 (Horiba, Ltd.).

Step (II)

If necessary, water (C-2) is added to the first emulsion composition from step (I) and dispersion is performed. Then component (D) is added to the first emulsion composition, whereupon emulsion polymerization is performed at a temperature of lower than 40° C. until the organopolysiloxane product reaches a viscosity at 25° C. of at least 300,000 mPa·s.

When water (C-2) is added to the first emulsion composition, the emulsion composition may then be further emulsified and dispersed by an emulsifying machine such as a high-pressure homogenizer.

In the emulsion polymerization step (II) of the first emulsion composition, it is recommended that the polymerization be performed at a temperature of lower than 40° C. for a time within 48 hours. If polymerization is performed above 40° C., there is a risk that more D4 forms. Thus, polymerization is preferably performed at a temperature below 25° C., more preferably below 15° C. If the polymerization time exceeds 48 hours, there is a risk that more D4 by-product forms. Thus, the polymerization time is preferably 1 to 40 hours, more preferably 5 to 30 hours.

The organopolysiloxane product resulting from the emulsion polymerization step (II) has a viscosity at 25° C. of at least 300,000 mPa·s, preferably at least 450,000 mPa·s, more preferably at least 600,000 mPa·s, and even more preferably at least 1,000,000 mPa·s. The upper limit of viscosity is up to 20,000,000 mPa·s, though not critical.

Other Treatment

At the end of polymerization, a basic substance is typically added to the resulting emulsion composition for neutralization. Suitable basic substances include sodium hydroxide, potassium hydroxide, sodium carbonate, sodium hydrogencarbonate, and amine compounds such as triethanolamine and triethylamine.

At this point, water may be added to the emulsion composition to adjust the silicone concentration. Also antiseptics and mildew-proofing agents may be added to improve the shelf life of the emulsion composition.

In weatherstrip, textile treating agent and resin modifier applications, an alkoxysilane may be added to the emulsion composition after the emulsifying step (I), emulsion polymerization step (II) or neutralization step, to introduce branched units or various functional groups into the organopolysiloxane chain. Suitable alkoxysilanes include $R^5{}_3Si(OR^6)$, $R^5{}_2Si(OR^6)_2$ and $R^5Si(OR^6)_3$ wherein $R^5$ is independently hydrogen or a substituted or unsubstituted monovalent hydrocarbon group of 1 to 20 carbon atoms, preferably 1 to 6 carbon atoms, such as methyl, ethyl, propyl, butyl or phenyl, and $R^6$ is independently hydrogen or an alkyl group of 1 to 20 carbon atoms.

From the preparation method of the invention, there is obtained the target emulsion composition containing an organopolysiloxane, which is described below.

The organopolysiloxane product in the target emulsion composition has a viscosity at 25° C. of at least 300,000 mPa·s, preferably at least 450,000 mPa·s, and more preferably at least 600,000 mPa·s. The upper limit of viscosity is typically up to about 10,000,000 mPa·s though not critical.

The emulsion composition contains emulsified particles with an average particle size of up to 500 nm, preferably up to 200 nm. The lower limit of particle size is typically at least about 30 nm though not critical. Most often the average particle size of emulsified particles in the emulsion composition resulting from the inventive method is up to 300 nm, that is, a very fine emulsion composition is obtained. It is noted that the average particle size of emulsified particles is a median diameter as measured by a laser diffraction/scattering method.

The content of octamethylcyclotetrasiloxane (D4) in the organopolysiloxane product is up to 3,000 ppm, preferably up to 2,000 ppm, and more preferably up to 1,000 ppm. The D4 content may be even 0 ppm although the lower limit of D4 content is not critical.

The content of decamethylcyclopentasiloxane in the organopolysiloxane product is preferably up to 3,000 ppm, more preferably up to 2,000 ppm, and even more preferably up to 1,000 ppm. This content may be even 0 ppm although the lower limit is not critical.

EXAMPLES

Examples of the invention are given below by way of illustration and not by way of limitation. All parts and "ppm" are by weight, and the kinematic viscosity having a unit of $mm^2/s$ is measured at 25° C. by an Ostwald viscometer.

Example 1

Using a homo-disper, (A) 100 parts of an organopolysiloxane capped with a silanol group at the end of its molecular chain and having a kinematic viscosity of 700 $mm^2/s$ (of formula (1) wherein $R^1$ is methyl, D4 content≤50 ppm), (B) 2 parts of polyoxyethylene tridecyl ether (EO 10 mol) and 3.5 parts of sodium dodecylbenzenesulfonate, and (C-1) 6 parts of water were emulsified to form a first emulsion. To the first emulsion was added (C-2) 84.9 parts of water, which was diluted and dispersed by a homo-mixer. Then (D) 1.2 parts of conc. hydrochloric acid was added to the first emulsion, whereupon emulsion polymerization was carried out at 10° C. for 22 hours. Thereafter, 2.4 parts of triethanolamine was added to the resulting emulsion, which was diluted and dispersed by a homo-mixer, yielding a target emulsion composition.

Example 2

Using a homo-disper, (A) 100 parts of an organopolysiloxane capped with a silanol group at the end of its molecular chain and having a kinematic viscosity of 700 $mm^2/s$ (of formula (1) wherein $R^1$ is methyl, D4 content≤50 ppm), (B) 7 parts of dodecylbenzenesulfonic acid, and (C-1) 6 parts of water were emulsified to form a first emulsion. To the first emulsion was added (C-2) 82.5 parts of water, which was diluted and dispersed by a homo-mixer. Then emulsion polymerization of the first emulsion was carried out at 10° C. for 15 hours. Thereafter, 4.5 parts of triethanolamine was added to the resulting emulsion, which was diluted and dispersed by a homo-mixer, yielding a target emulsion composition.

Example 3

Using a homo-disper, (A) 100 parts of an organopolysiloxane capped with a silanol group at the end of its molecular chain and having a kinematic viscosity of 1,500 $mm^2/s$ (of formula (1) wherein $R^1$ is methyl, D4 content≤50 ppm), (B) 3 parts of polyoxyethylene tridecyl ether (EO 10 mol) and 4 parts of sodium dodecylbenzenesulfonate, and (C-1) 6 parts of water were emulsified to form a first emulsion. To the first emulsion was added (C-2) 83.4 parts of water, which was diluted and dispersed by a homo-mixer. Then (D) 1.2 parts of conc. hydrochloric acid was added to the first emulsion, whereupon emulsion polymerization was carried out at 10° C. for 17 hours. Thereafter, 2.4 parts of triethanolamine was added to the resulting emulsion, which was diluted and dispersed by a homo-mixer, yielding a target emulsion composition.

Comparative Example 1

Using a homo-disper, (A) 100 parts of an organopolysiloxane capped with a silanol group at the end of its molecular chain and having a kinematic viscosity of 5,000 $mm^2/s$ (of formula (1) wherein $R^1$ is methyl, D4 content≤50 ppm), (B) 4 parts of polyoxyethylene tridecyl ether (EO 10 mol) and 4 parts of dodecylbenzenesulfonic acid, and (C-1) 6 parts of water were emulsified to form a first emulsion. Then (C-2) 83.6 parts of water was added to the first emulsion, which was diluted and dispersed by a homo-mixer, whereupon emulsion polymerization was carried out at 0° C. for 15 hours. Thereafter, 2.4 parts of triethanolamine was added to the resulting emulsion, which was diluted and dispersed by a homo-mixer, yielding a target emulsion composition.

Comparative Example 2

To a premix of 9.1 parts of triethanolamine and 10.5 parts of Marlon AS 3 (alkylbenzenesulfonic acid, by Sasol), 100 parts of an organopolysiloxane capped with a silanol group at the end of its molecular chain and having a kinematic viscosity of 2,500 $mm^2/s$ and 4.1 parts of water were added, which was emulsified using a change can mixer. Then 57.3 parts of water was added to the resulting emulsion, which was diluted and dispersed by the change can mixer, yielding a master batch emulsion. The master batch emulsion, 100 parts, was cooled down to a temperature of 21° C., whereupon 15.2 parts of 10 wt % sulfuric acid was added as an emulsion polymerization initiator. The temperature was lowered to 10° C. over 4 hours, after which emulsion polymerization was carried out at 10° C. for 10 hours. Thereafter, 4 parts of triethanolamine was added to the resulting emulsion, which was diluted and dispersed, yielding a target emulsion composition.

Comparative Example 3

Using a homo-disper, (A) 100 parts of an organopolysiloxane capped with a silanol group at the end of its molecular chain and having a kinematic viscosity of 150 $mm^2/s$ (of formula (1) wherein $R^1$ is methyl, D4 content≤50 ppm), (B) 2 parts of polyoxyethylene tridecyl ether (EO 10 mol) and 3.5 parts of sodium dodecylbenzenesulfonate, and (C-1) 6 parts of water were emulsified to form a first emulsion. To the first emulsion was added (C-2) 84.9 parts of water, which was diluted and dispersed by a homo-mixer. Then (D) 1.2 parts of conc. hydrochloric acid was added to the first emulsion, whereupon emulsion polymerization was carried out at 10° C. for 32 hours. Thereafter, 2.4 parts of triethanolamine was added to the resulting emulsion, which was diluted and dispersed by a homo-mixer, yielding a target emulsion composition.

The target emulsion compositions thus obtained were measured or evaluated for properties by the following methods. The results are shown in Table 1.

Average Particle Size of Emulsion

The average particle size is a median diameter as measured by a laser diffraction/scattering mode particle size distribution analyzer LA-920 (Horiba, Ltd.).

Organopolysiloxane Viscosity

The viscosity of organopolysiloxane having a unit of mPa·s is a viscosity at 25° C. as measured by adding, with stirring, 300 g of isopropyl alcohol to 300 g of the emulsion composition prepared above, collecting only the precipitated organopolysiloxane, drying at 105° C. for 3 hours, and analyzing at 25° C. by a rotational viscometer.

D4 Content in Organopolysiloxane

The content of D4 was quantitatively determined by combining 0.1 g of the emulsion composition with 10 ml of acetone containing 20 ppm of tetradecane as internal standard, shaking for 3 hours for extraction, allowing to stand overnight, taking out the acetone layer, and analyzing by gas chromatography.

Emulsion Stability

A 100-mL glass vial was filled with 100 g of the emulsion composition, which was allowed to stand at 50° C. for 3 months. The outer appearance of the emulsion was observed. The emulsion was rated stable (◯) when it maintained a uniform phase without separation and unstable (×) when it separated into two phases.

TABLE 1

|  |  | Polymerization temperature (° C.) | Polymerization time (hr) | Average particle size (nm) | Siloxane viscosity (mPa · s) | D4 content (ppm) | Stability @50° C./ 3 months |
|---|---|---|---|---|---|---|---|
| Example | 1 | 10 | 22 | 170 | 1,700,000 | 750 | ◯ |
|  | 2 | 10 | 15 | 180 | 1,900,000 | 800 | ◯ |
|  | 3 | 10 | 17 | 170 | 1,800,000 | 760 | ◯ |
| Comparative Example | 1 | 0 | 15 | 150 | 2,200,000 | 1,200 | X |
|  | 2 | 10 | 14 | 190 | 1,700,000 | 880 | X |
|  | 3 | 10 | 32 | 150 | 2,200,000 | 2,600 | X |

D4: octamethylcyclotetrasiloxane

INDUSTRIAL APPLICABILITY

The organopolysiloxane emulsion composition obtained from the inventive method is improved in stability and feeling on use. Thus it is especially useful in cosmetics and household agents, for example, in hair care products such as shampoo and conditioner. The composition can also be utilized as protective members for household tools and goods, parting agents for molds used in the processing of rubber articles and plastic articles, and textile treating agents for the purpose of imparting water repellency and plasticity to textile fabrics.

Japanese Patent Application Nos. 2015-043218 and 2015-199826 are incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for preparing an organopolysiloxane emulsion composition comprising the steps of:

(I) emulsifying a mixture to form a first emulsion composition, the mixture comprising (A) 100 parts by weight of an organopolysiloxane having the general formula (1):

$$HO(R^1{}_2SiO)_nH \qquad (1)$$

wherein $R^1$ is independently hydrogen or a substituted or unsubstituted monovalent hydrocarbon group of 1 to 20 carbon atoms and n is such a number that the organopolysiloxane has a kinematic viscosity of 200 mm²/s to less than 2,000 mm²/s at 25° C., said organopolysiloxane having an octamethylcyclotetrasiloxane content of up to 1,000 ppm, (B) 1 to 8 parts by weight of a surfactant, and (C-1) 1 to 10,000 parts by weight of water, and (II) optionally adding (C-2) 0 to 10,000 parts by weight of water and effecting emulsion polymerization of the first emulsion composition in the presence of (D) an acid catalyst, which is optional when component (B) is catalytic, at a temperature of lower than 40° C., thereby forming a target organopolysiloxane emulsion composition which contains an organopolysiloxane product having a viscosity of at least 300,000 mPa·s at 25° C. and an octamethylcyclotetrasiloxane content of up to 3,000 ppm and has an emulsified particle size of up to 500 nm, wherein the surfactant (B) consists of the following (i) or (ii):

(i) an anionic surfactant, (ii) an anionic surfactant in admixture with a nonionic surfactant, said nonionic surfactant having general formula (2):

$$R^2O(EO)_p(PO)_qH \qquad (2)$$

wherein $R^2$ is a straight or branched $C_8$-$C_{30}$ alkyl group, EO is ethylene oxide, PO is propylene oxide, the sequence of EO and PO may be random or blockwise, p and q each are an integer of 0 to 100, and p+q>0.

2. The method of claim 1 wherein when the first emulsion composition is prepared in step (I) using an emulsifying machine for processing emulsified particles under pressure to a smaller size, the amount of water (C-1) is 1 to 10,000 parts by weight per 100 parts by weight of component (A).

3. The method of claim 1 wherein when the first emulsion composition is prepared in step (I) using an emulsifying machine for processing emulsified particles under shear force to a smaller size, the amount of water (C-1) is 1 to 10 parts by weight per 100 parts by weight of component (A).

4. The method of claim 1 wherein the acid catalyst (D) is present in an amount of at least 0.1 part by weight per 100 parts by weight of component (A), with the proviso that when the surfactant (B) contains a catalytic fraction which is encompassed in the acid catalyst (D), the amount of the acid catalyst (D) is inclusive of the amount of said fraction of surfactant (B).

5. The method of claim 1 wherein the first emulsion composition resulting from step (I) has an emulsified particle size of up to 500 nm.

6. The method of claim 1 wherein the emulsion polymerization step (II) is performed at a temperature of lower than 25° C.

7. The method of claim 1 wherein the emulsion polymerization step (II) is performed for a time within 48 hours.

8. The method of claim 1 wherein the target emulsion composition contains emulsified particles with an average particle size of up to 200 nm.

9. The method of claim 1 wherein the organopolysiloxane product in the target emulsion composition has a viscosity of at least 1,000,000 mPa·s at 25° C.

10. The method of claim 1 wherein the organopolysiloxane product in the target emulsion composition has an octamethylcyclotetrasiloxane content of up to 2,000 ppm.

11. The method of claim 1, wherein the amount of nonionic surfactant is at least 2 parts by weight per 100 parts by weight of component (A).

12. The method of claim 1 wherein when the first emulsion composition is prepared in step (I) using an emulsifying machine for processing emulsified particles under shear force to a smaller size, the amount of water (C-1) is 1 to 10 parts by weight per 100 parts by weight of component (A), and the emulsion polymerization step (II) is performed at a temperature of lower than 25° C.

\* \* \* \* \*